(No Model.)
W. T. RUSSELL.
BROILER OR TOASTER.
No. 514,568. Patented Feb. 13, 1894.
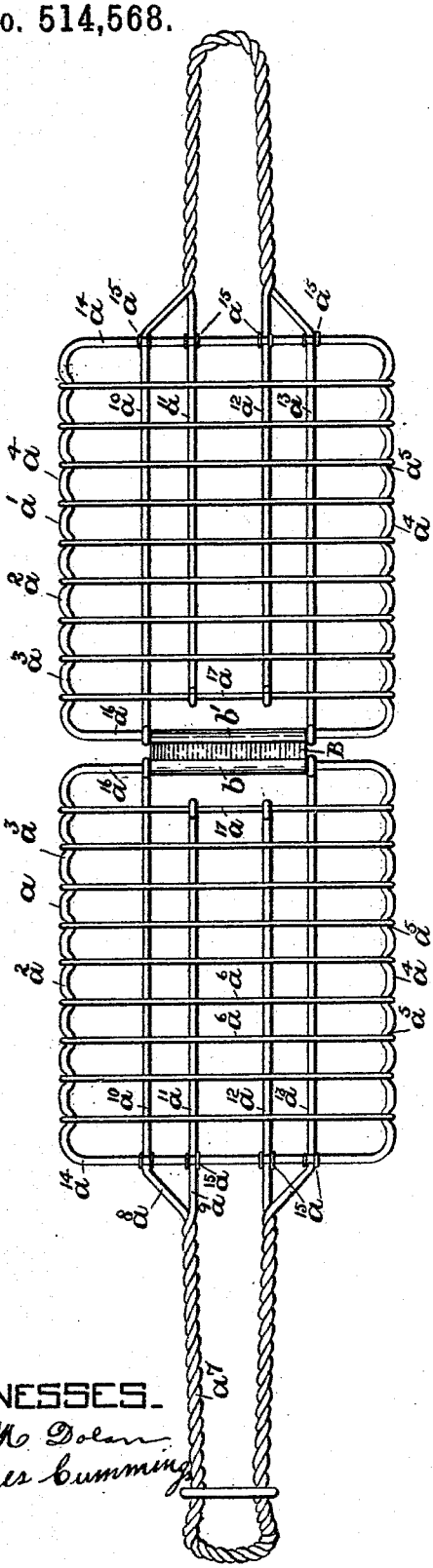
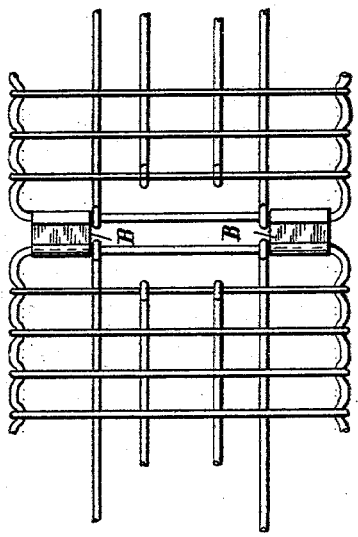
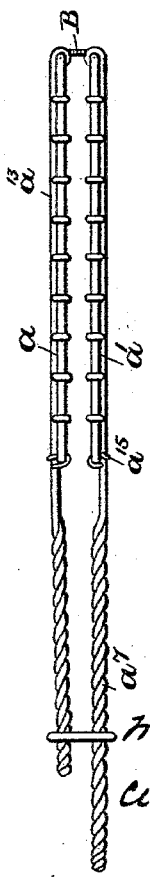
WITNESSES
J. M. Dolan
James Cumming
INVENTOR
W. T. Russell
by his attys
Clark & Raymond

UNITED STATES PATENT OFFICE.

WILLIAM T. RUSSELL, OF WORCESTER, MASSACHUSETTS.

BROILER OR TOASTER.

SPECIFICATION forming part of Letters Patent No. 514,568, dated February 13, 1894.

Application filed March 24, 1892. Serial No. 426,187. (No model.)

*To all whom it may concern:*

Be it known that I, WILLIAM T. RUSSELL, a citizen of the United States, residing at Worcester, in the county of Worcester, State of Massachusetts, have invented a new and useful Improvement in Broilers or Toasters, of which the following is a full, clear, and exact description, reference being had to the accompanying drawings, forming a part of this specification, in explaining its nature.

The invention relates to a toaster or broiler made of wire, having a hinge of peculiar construction combined with the handles of the toaster which are made of two twisted strands of wire separated near their union with the main sections of the broiler to form stay rods and braces.

In the drawings Figure 1 is a view of the broiler wide open. Fig. 2 is a view in side elevation of it closed. Fig. 3 is a detail view, showing a modified form of the hinge.

The broiler or toaster comprises two sections $a\ a'$, each section has a frame $a^2$, which is made of a single wire $a^3$ bent into a square or rectangular form, the ends of which preferably abut at the point covered by the uniting hinge. The side bars $a^4$ of this wire preferably have inward curves $a^5$, which form the spacings for the cross wires $a^6$. Each section has also the handle $a^7$, formed by twisting the strands or wires $a^8\ a^9$ at the center of their length for a distance sufficient to provide the handle. These strands are then separated from the handle, and are united to the frame and provide four cross stay wires or braces which are lettered in the drawings $a^{10}\ a^{11}\ a^{12}\ a^{13}$. They are united to the front bar $a^{14}$ of the frame by wire holders or ties $a^{15}$, or in any other desired way, and the outer ones $a^{10}\ a^{13}$ extend to the rear bar $a^{16}$ to which they are united, while the inner ones $a^{11}\ a^{12}$ extend to the cross bar $a^{17}$. Each section is thus provided with a suitable grating or frame attached to and supported by the spread arms of the section of the handle secured to it, which arms extend at a right angle across the frame from the front bar to, or nearly to, the rear bar, and are separated upon the grating or frame to provide supports for the cross wires at suitable distances from one side to the other of the frame. These sections are united to each other by the long hinge B, preferably made of sheet metal, and of a length to extend between the handle wires or bars $a^{10}$ $a^{13}$. Its edges $b\ b'$ are curved or turned about the rear bar of each section sufficiently to firmly unite the bars, but, of course, not so tightly as to prevent the bars from turning in the sockets thus formed. By not extending the wires or stays $a^{11}\ a^{12}$ to the rear bars of each frame there is left or provided an unobstructed section of each of the rear bars over which the edges of the long hinging section may be folded or curved.

One advantage of this hinge arises from the fact that being long, and being confined between the ends of the stay bars, it gives great rigidity to the construction, while it holds the parts separated at their rear or inner ends. The outer stay rods maintain the hinge in its central position, and extending from each end thereof forward into the handle co-operate therewith in providing a very stiff and desirable construction.

I would say that instead of locating the sheet metal hinge where indicated, it may be made in two parts and applied, one between the stay rods $a^{10}$ and side or outer bar of each frame, and the other between the stay rods $a^{13}$ and the other side rod of each frame.

Having thus fully described my invention, I claim and desire to secure by Letters Patent of the United States—

The combination in a wire toaster or broiler of the sections $a\ a'$ each of which consists of a square or rectangular wire frame and cross rods, and a twisted handle, the strands of which are separated, and two of which strands are united to the front and rear bars of the frame, and two of which to the front and cross bar next to the rear one, and the hinge B connecting the two rear bars of each section together and arranged in relation to the stay rods, as specified, as and for the purposes described.

WILLIAM T. RUSSELL.

Witnesses:
F. F. RAYMOND, 2d.,
J. M. DOLAN.